US012591284B2

(12) United States Patent
Khosrowpour et al.

(10) Patent No.: US 12,591,284 B2
(45) Date of Patent: Mar. 31, 2026

(54) RUNNING AVERAGE POWER LEVEL ASSIGNMENT IN AN INFORMATION HANDLING SYSTEM

(71) Applicant: DELL PRODUCTS L.P., Round Rock, TX (US)

(72) Inventors: Farzad Khosrowpour, Pflugerville, TX (US); Yan Ning, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 238 days.

(21) Appl. No.: 18/500,022

(22) Filed: Nov. 1, 2023

(65) Prior Publication Data

US 2025/0138610 A1 May 1, 2025

(51) Int. Cl.
G06F 1/26 (2006.01)
(52) U.S. Cl.
CPC ...................................... G06F 1/26 (2013.01)
(58) Field of Classification Search
None
See application file for complete search history.

(56) References Cited

U.S. PATENT DOCUMENTS

| | | | |
|---|---|---|---|
| 9,870,037 B2 | 1/2018 | Jenne et al. | |
| 2008/0057894 A1* | 3/2008 | Aleksic | H04W 52/0258 |
| | | | 455/187.1 |
| 2016/0179117 A1* | 6/2016 | Eastep | G06F 1/324 |
| | | | 700/291 |
| 2017/0220362 A1 | 8/2017 | Jenne et al. | |
| 2017/0285702 A1* | 10/2017 | Song | G06F 1/3206 |
| 2021/0232200 A1* | 7/2021 | King | G06F 9/4893 |

* cited by examiner

*Primary Examiner* — Danny Chan
(74) *Attorney, Agent, or Firm* — Larson Newman, LLP

(57) ABSTRACT

An information handling system stores a knob table, and determines time series data for one or more applications being executed. The information handling system extracts features associated with the system, and determines a system type for the information handling system. The system determines a running average power level based on the time series data, the extracted features, and the system type. Based on the determined running average power level, the information handling system determines a configuration knob to optimize the system. The configuration knob is determined from the knob table in the memory.

20 Claims, 5 Drawing Sheets

Information Handling System 100

Application 108

Processor 102

Cooling Fan 104

ML Model 110

Memory 106

Knob Table 120

RUNNING AVERAGE POWER LEVEL ASSIGNMENT IN AN INFORMATION HANDLING SYSTEM

FIELD OF THE DISCLOSURE

The present disclosure generally relates to information handling systems, and more particularly relates to assigning a running average power level in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory that may store a knob table. A processor may determine time series data for one or more applications being executed. The processor may extract features associated with the information handling system. The processor may determine a system type for the information handling system. The processor may determine a running average power level based on the time series data, the extracted features, and the system type. Based on the determined running average power level, the processor may determine a configuration knob to optimize the information handling system. The configuration knob is determined from the knob table in the memory.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
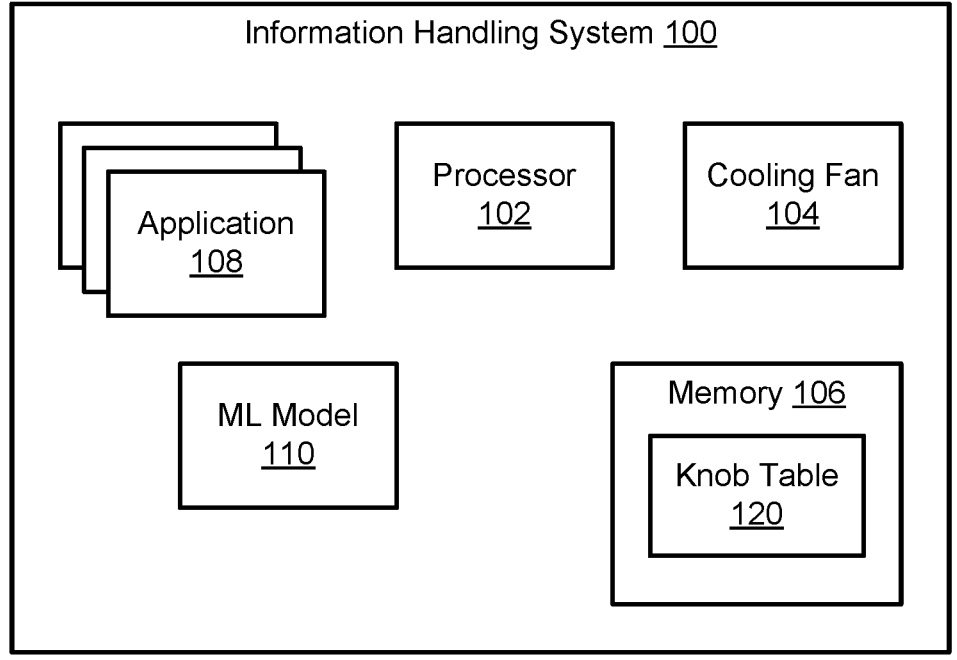
FIG. 1 is a block diagram of a portion of an information handling system according to at least one embodiment of the present disclosure.

FIG. 1 illustrates a portion of an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a processor 102, a cooling fan 104, a memory 106, one or more applications 108, and one or more machine learning (ML) models 110. Memory 106 may store a knob table 120. Processor 102 may communicate with memory 106 to retrieve or store data, such as data within knob table 120. Processor 102 may execute applications 108 and ML models 110. Cooling fan 104 may provide an airflow within information handling system 100 to cool the components of the information handling system. Information handling system

100 may include additional components without varying from the scope of this disclosure.

In an example, certain parameters or limits of information handling system 100, such as dynamic application power is not a limit that can be determined ahead of time in design phase as function of applications and workloads. Parameters such as running average power levels (RAPL) for processor 102 may vary parameters in time series that can be observed, however the limits of contributions by application 108 may not be known. In an example, application 108 may not require single level of control for optimal operation. In this example, a determination may be made for a contribution level of application 108 to the power of processor 102 and rotations per minute (RPM) of cooling fan 104 before an improved control mechanism may be applied.

In certain examples, information handling system 100 may have a wide range of dynamic parameters that may vary based on hardware components within information handling system 100. In an example, these parameters may include, but are not limited to, optimization of power, performance, and fan noise. Processor 102, via RAPL, may not be able to identify a minimum or maximum power consumption. In an example, RAPL limits may change based on what else, such as other applications 108, is concurrently running on information handling system. The level of contribution of power to processor 102 based on execution of application 108 should be characterized before a usable configuration knob to improve the performance of the application may be applied to information handling system 100.

Information handling system 100 may be improved by processor 102 creating an acceptable range for a system power through which may be utilized to set a threshold for decision making as the load of application 108 on information handling system 100 changes. In certain examples, if processor 102 does not know an exact impact of application 108 on the RAPL of the processor, any selection of different configuration knobs and controls to improve performance or power may be ineffective. Information handling system 100 may also be improved by defining ranges of RAPL to enable processor 102 to appropriately select the correct configuration knobs. In an example, a dynamic determination of whether power levels for application 108 are getting high or low may not be possible unless processor 102 compares the determine power level to a known level, such as PL1 for information handling system 100. However, when concurrent applications 108 are running, PL1 may define system level limits and not limits of an individual application 108.

Information handling system 100 may further be improved by processor 102 combining the parameters that indicate application dependency, application usage, system level attributes, and other parameters. In an example, the system level attributes may define a physical characterize information handling system 100. The other parameters may define an application concurrency from a utilization perspective. Processor 102 may utilize one or more ML models 110, such as ML models 202 and 204 of FIG. 2, to identify RAPL thresholds.

In certain examples, ML models 110 may be set up or trained based on different criteria. For example, a setting within ML model 110 may include that the RAPL may always be lower than the lowest PL4. Additionally, the RAPL is an average so that while power spikes may occur new PL2 RAPL may normally be less than PL2. In an example, if application 108 is creating a heavy load for long durations on processor 102, RAPL may be near PL1. ML models 110 may also include data associated with PL2 values and PL1/2 limits, such that the ML models may infer the RAPL power limits for processor 102. In certain examples, attributes of system utilization as compared to application utilization may enable ML model 110 to determine the contribution of RAPL based on the application utilization and concurrency.

Figure 2:
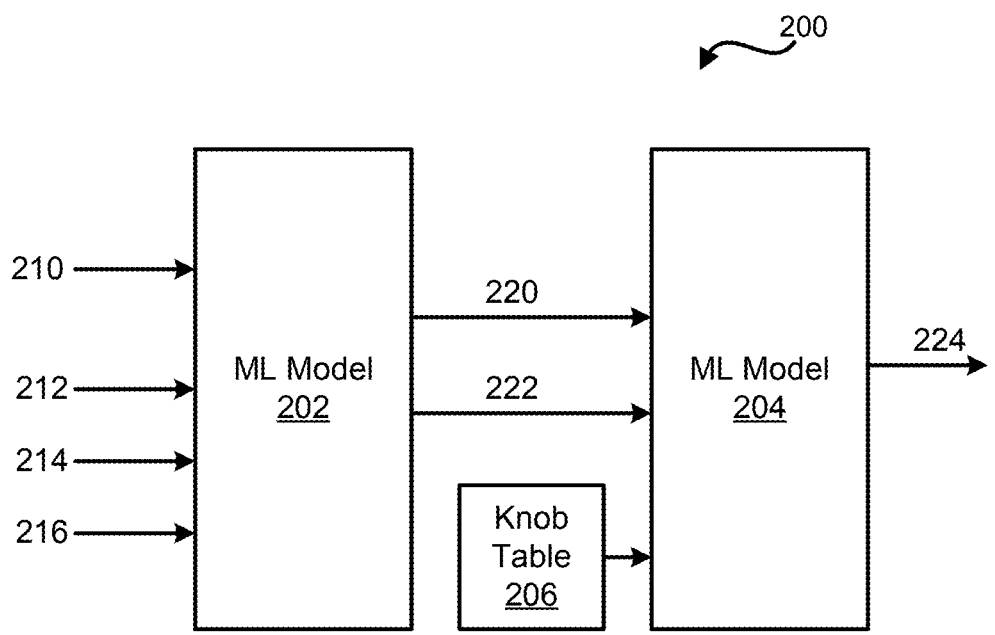
FIG. 2 is a block diagram of machine learning models to determine a configuration knob type for an information handling system according to at least one embodiment of the present disclosure.

FIG. 2 illustrates a system 200 including ML models 202 and 204 according to at least one embodiment of the present disclosure. In an example, ML models 202 and 204 may be combined with a knob table 206 to determine actual RAPL limits and select configuration knobs. ML model 202 has inputs 210, 212, 214, and 216 and outputs 220 and 222. Outputs 220 and 222 of ML model 202 may be inputs 220 and 222 of ML model 204 along within an input from configuration knob table 206. ML model 204 includes an output 224. ML models may be non-supervised ML models.

In an example, input 210 may include multiple system or physical input variables. For example, ML model 202 may receive different power levels associated within an information handling system, such as information handling system 100 of FIG. 1. In an example, the power levels may include, but are not limited to, PL1, PL2, Physical system PL2, PL4, (RSOC), a RPM of cooling fan 104, a USTT mode, RAPL, a platform power (PSYS), and EPO gear. In certain examples, system input variables on input 210 may be a function of a type of information handling system. Based on the system input variables, an explicit system type of information handling system 100 of FIG. 1, does not need to be received at input 210.

In certain examples, input 212 may include multiple concurrency variables for ML model 202. For example, input 212 may receive a CPU utilization, a GPU utilization, a storage utilization, and a network utilization. In an example, these utilization attributes may be system level attributes, such that both application and concurrent processes contribute to the utilization levels received at input 212.

Input 214 may receive application utilization attributes. In an example, the application utilization attributes may indicate system resource allocations that are exclusive to the application. These system resources may include, but are not limited to, processor time, thread count, and input/output (IO) operations per second.

Input 216 may receive application classification and sub-classification characterizations and configuration knob priority selection data. In an example, the application classification and sub-classification characterizations may be generated via any suitable manner. For example, the characterizations may be made via one or more application classification inference models. In an example, the knob priority input may identify a knob priority sequence, such as performance/watt, fan RPM, power, performance, or the like.

In an example, ML model 202 may utilize the variables received at inputs 210, 212, 214, and 216 to determine RAPLs for a particular application, such as application 108 of FIG. 1, and any other suitable configuration of a component within information handling system 100. While any suitable component configuration or setting may be determined or predicted by ML model 202, for clarity and brevity the only setting described herein will be an RPM for cooling fan 104 of FIG. 1.

In certain examples, ML model 202 may include one or more suitable hidden layers to perform different operations on the variable received at input 210, 212, 214, and 216. These hidden layers may utilize the system level variables, concurrency variables, application usage variables, and application variables to determine a RAPL and RPM. In an example, ML model 202 may be applied to different information handling systems and the information handling systems may have the same or different hardware configurations. In certain examples, ML model 202 may group or cluster different information handling system hardware configurations into different RAPLs, such as a high RAPL, a medium RAPL, and a low RAPL.

In an example, two users using same information handling system and application, such as information handling system 100 and application 108 of FIG. 1, may stress the RAPL to different levels. These different levels or limits of RAPL may depend on application type, concurrency, system, and application usage or persona. For a given application or application type RAPL limits may vary depending on concurrency levels received at input 212. In an example, ML model 202 may determine RAPL limits based on different systems characteristics. For example, ML model 202 may determine RAPL limits based on a high application usage and low concurrency with other application, RAPL limits with a low application usage and low concurrency with other applications, and RAPL limits with low application usage and high concurrency with other applications. In an example, ML model 202 may also determine RAPL limits with high application usage and high concurrency with other applications. In this example, the RAPL limit may approaches limits of information handling system 100.

ML model 202 may provide the determined RAPL on output 220. In an example, ML model 202 may group of cluster information handling systems with different utilization levels into different groups or clusters of RPM values, such as a high RPM, a medium RPM, and a low RPM. ML model 202 may provide the determined RPM cluster on output 222.

In an example, ML model 204 may receive the RAPL on input 220, the RPM on input 222, and data from a knob table 206. In certain examples, knob table 206 may include one or more configuration knobs for optimizing a particular application. Knob table 206 may be preloaded with the different configuration knobs and information associated with the knobs such as its responsiveness score and memory utilization. The configuration knobs, also referred to herein simply as knobs, may be software control mechanisms associated with an application that may be used to tune or adjust a configuration setting of the application. In an example, knob look up table 206 may be built via a preamble process and pre-installed into memory 106 of FIG. 1 for knob selection during runtime. In certain examples, some configuration knobs may overlap, or some knobs may be equal to system default.

Based on the data from inputs 220, 222, and 206, ML model 204 may perform one or more operations within one or more hidden layers to determine how to assign the knobs to optimize the system for user experience. ML model 204 may provide the knob type at output 224. In an example, this knob type may be utilized by a processor, such as processor 102 of FIG. 1, to optimize an application, such as application 108 of FIG. 1. When applying system knobs, ML models 202 and 204 may determine whether an application is used in light mode or heavy mode. Based on this determination ML 204 may determine which configuration knob in knob table 206 to apply and more effectively provide the best solution to the user of information handling system 100.

Figure 3:
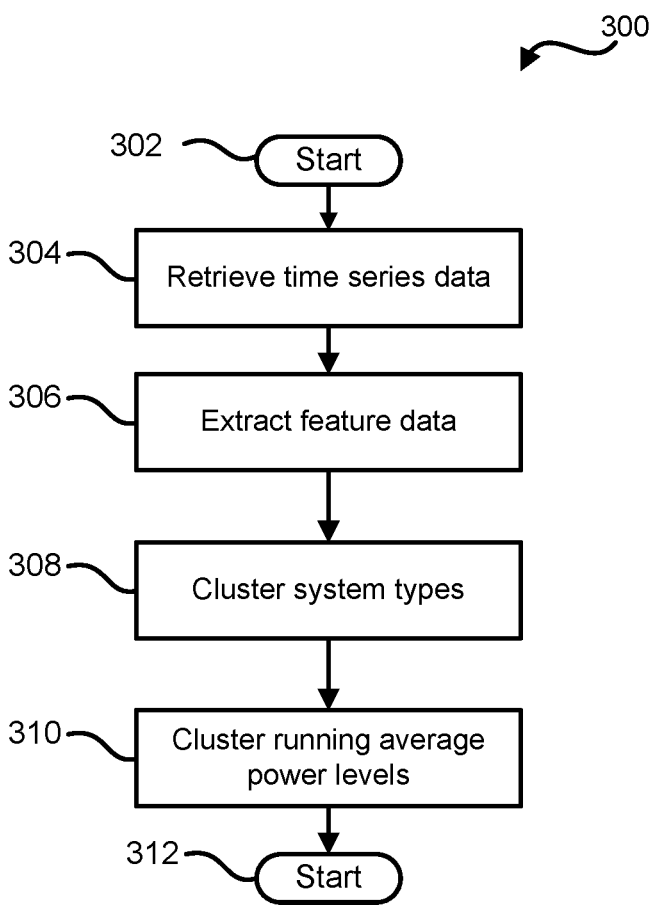
FIG. 3 is a flow diagram of a method for creating running average power level clusters according to at least one embodiment of the present disclosure.

FIG. 3 is a flow diagram of a method 300 for creating running average power level clusters according to at least one embodiment of the present disclosure, starting at block 302. In an example, method 300 may be performed by any suitable component including, but not limited to, processor 102 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 304, time series data for an information handling system and an application is received. In an example, the time series data may include, but is not limited to, system physical parameter, application type and utilization, and application concurrency. At block 306, features of the information handling system and the application are extracted. In an example, the features may be extracted from the received time series data. In certain examples, the features may include a maximum, a minimum, an average, a stand deviation, tenth percentile, ninetieth percentile, or the like for each time series variable. The extracted features may be provided as inputs to a non-supervised clustering model.

At block 308, system types are clustered. In an example, a non-supervised clustering model is utilized to cluster or group different information handling systems into several different system types. In certain examples, the grouping or clustering of the systems may be performed because RAPL ranges are highly system dependent. In an example, the number of system types generated from the clustering models may be much smaller than the unique system configuration types. The smaller number of system types may enable the ML model to collect training data and implement the approach during a development stage. In certain examples, centroids for the system types may also be determined.

At block 310, RAPL limits may be clustered, and the flow ends at block 312. In an example, the RAPL limit clusters may be a low RAPL, a medium RAPL, and a high RAPL. Based on the RAPL values of the centroids of system type clusters, the RAPL limit level may be assigned to each cluster. In certain examples, centroids for the RAPL limits may also be determined.

Figure 4:
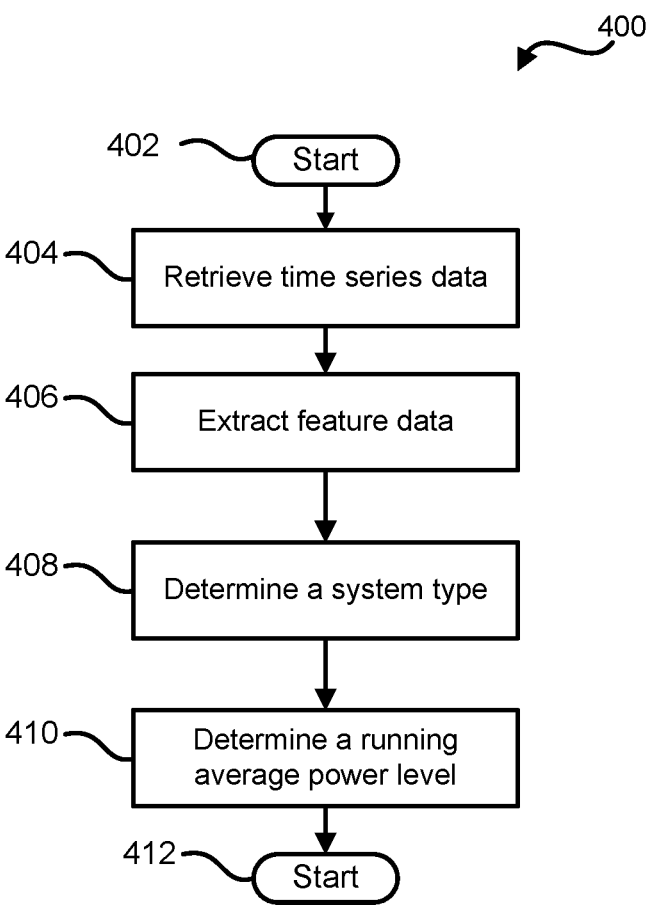
FIG. 4 is a flow diagram of a method for predicting a running average power level for an information handling system according to at least one embodiment of the present disclosure.

FIG. 4 is a flow diagram of a method 400 for ranking test case breakpoints according to at least one embodiment of the present disclosure, starting at block 402. In an example, method 400 may be performed by any suitable component including, but not limited to, processor 102 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 404, time series data for an information handling system and an application is received. In an example, the time series data may include, but is not limited to, system physical parameter, application type and utilization, and application concurrency. At block 406, features of the information handling system and the application are extracted. In an example, the features may be extracted from the received time series data. In certain examples, the features may include a maximum, a minimum, an average, a stand deviation, tenth percentile, ninetieth percentile, or the like for each time series variable.

At block 408, a system type is determined. In an example, the system type for the information handling system and running application may be determined in any suitable manner. For example, a determination may be made as to which system type cluster the current application, time series data, and features data belongs to based on distances from the centroids of the different system type clusters.

At block 410, a RAPL limit is determined, and the flow ends at block 412. In an example, the RAPL level may be determined in any suitable manner. For example, a determination may be made as to RAPL cluster, such as high, medium, or low, the current application, time series data, and features data belongs to based on distances from the centroids of the different RAPL clusters. Based on the determined RAPL limit, a power limit for the application is set based on hardware dependent parameters that are learned at runtime of the information handling system.

Figure 5:
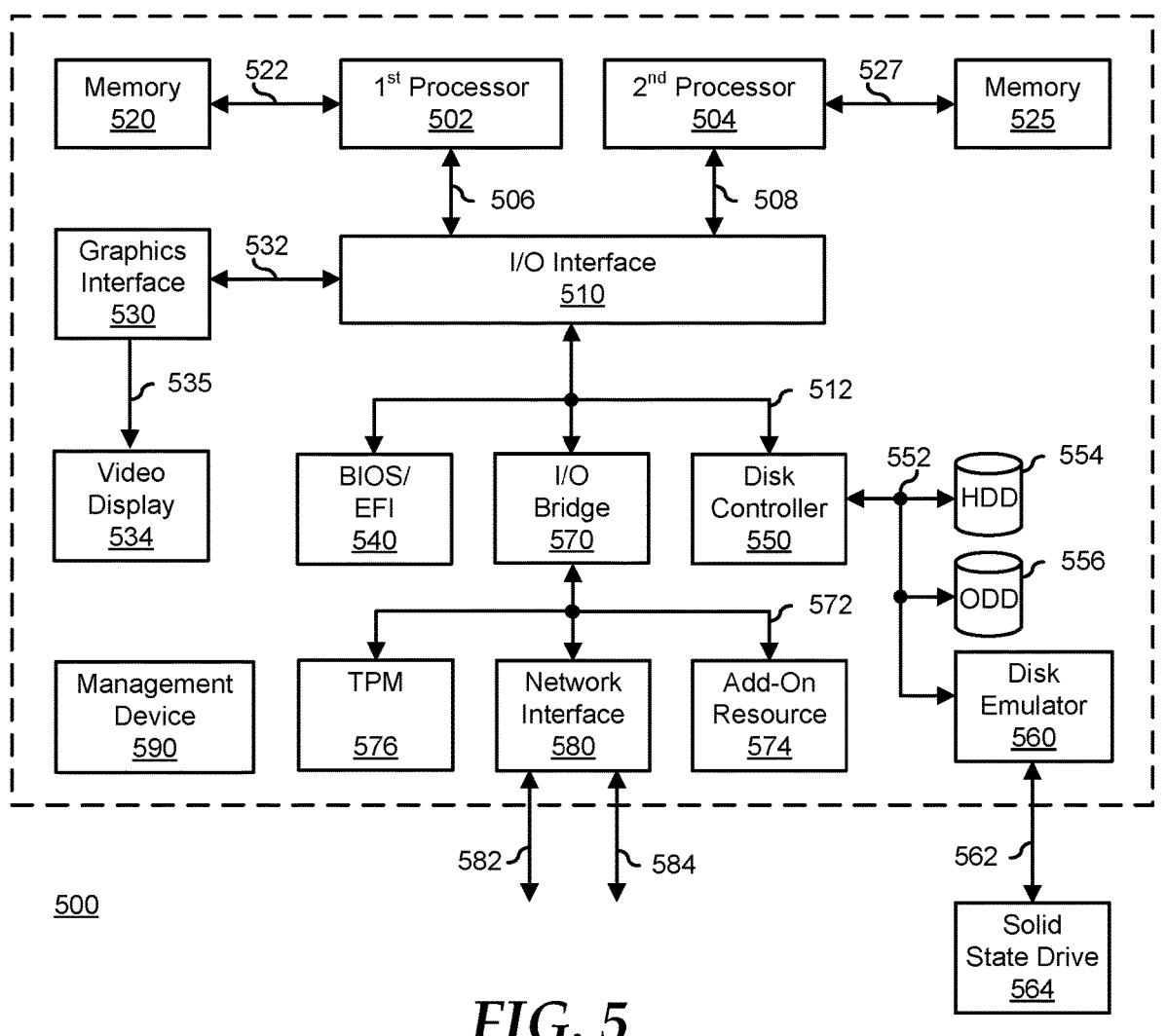
FIG. 5 is a block diagram of a general information handling system according to an embodiment of the present disclosure.

FIG. 5 shows a generalized embodiment of an information handling system 500 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 4394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a memory to store a knob table, wherein the knob table includes information associated with different configuration knobs in the knob table, the information includes different responsiveness scores and memory utilizations for the different configuration knobs, wherein the configuration knobs are software control mechanisms associated with an application that are utilized to tune or adjust a configuration setting of the application; and
   a processor to communicate with the memory, wherein during a runtime of the information handling system, the processor to:
   determine time series data for one or more applications being executed;
   extract features associated with the information handling system;
   determine a system type for the information handling system;
   determine a running average power level based on the time series data, the extracted features, and the system type; and
   determine a configuration knob to optimize the information handling system based on the determined running average power level, wherein the configuration knob is determined from the knob table in the memory.

2. The information handling system of claim 1, wherein the determination of the configuration knob includes the processor further to:
   determine an application to be optimized in the information handling system; and
   determine a user selected knob priority, wherein the determination of the configuration knob is further determined based on the application to the optimized and the user selected knob priority.

3. The information handling system of claim 2, wherein the determination of the configuration knob is further based on a utilization of the application to be optimized.

4. The information handling system of claim 3, wherein the utilization of the application includes data associated with system resource allocations exclusive to the application.

5. The information handling system of claim 1, wherein prior to the runtime, the processor further to: execute a clustering model to group information handling systems into several different system types based on features associated with the information handling systems.

6. The information handling system of claim 5, wherein for each system type of the several different system types and prior to the runtime, the processor further to:
   execute second clustering model to generate a plurality of running average power level clusters; and
   assign a high level, a medium level, or a low level to each of the running average power levels.

7. The information handling system of claim 1, wherein the determination of the running average power level includes the processor further to: assign the information handling system to a running average power level cluster.

8. The information handling system of claim 1, wherein time series data includes physical parameters of the information handling system, types of the applications, utilization of the applications, and application concurrency data.

9. A method comprising:

during a runtime of an information handling system:

determining, by a processor of the information handling system, time series data for one or more applications being executed;

extracting features associated with the information handling system;

determining a system type for the information handling system;

determining a running average power level based on the time series data, the extracted features, and the system type; and determining, by the processor, a configuration knob to optimize the information handling system based on the determined running average power level, wherein the configuration knob is determined from the knob table in the memory, wherein the knob table includes information associated with different configuration knobs in the knob table, the information includes different responsiveness scores and memory utilizations for the different configuration knobs, wherein the configuration knobs are software control mechanisms associated with an application that are utilized to tune or adjust a configuration setting of the application.

10. The method of claim 9, wherein the determining of the configuration knob includes the method further comprising:

determining an application to be optimized in the information handling system; and determining a user selected knob priority, wherein the determination of the configuration knob is further determined based on the application to the optimized and the user selected knob priority.

11. The method of claim 10, wherein the determining of the configuration knob is further based on a utilization of the application to be optimized.

12. The method of claim 11, wherein the utilization of the application includes data associated with system resource allocations exclusive to the application.

13. The method of claim 12, wherein prior to the runtime, the method further comprising: execute a clustering model to group information handling systems into several different system types based on features associated with the information handling systems.

14. The method of claim 13, wherein for each system type of the several different system types and prior to the runtime, the method further comprising:

executing second clustering model to generate a plurality of running average power level clusters; and assigning a high level, a medium level, or a low level to each of the running average power levels.

15. The method of claim 9, wherein the determination of the running average power level includes the processor further to: assigning the information handling system to a running average power level cluster.

16. The method of claim 9, wherein time series data includes physical parameters of the information handling system, types of the applications, utilization of the applications, and application concurrency data.

17. An information handling system comprising:

a memory to store a knob table; and a processor to:

execute a first clustering model to generate a plurality of running average power level clusters;

assign a high level, a medium level, or a low level to each of the running average power levels;

during a runtime of the information handling system, the processor to:

determine time series data for one or more applications being executed;

extract features associated with the information handling system;

determine a system type for the information handling system;

determine a running average power level based on the time series data, the extracted features, and the system type;

assign the information handling system to a running average power level cluster; and determine a configuration knob to optimize the information handling system based on the determined running average power level, wherein the configuration knob is determined from the knob table in the memory, wherein the knob table includes information associated with different configuration knobs in the knob table, the information includes different responsiveness scores and memory utilizations for the different configuration knobs, wherein the configuration knobs are software control mechanisms associated with an application that are utilized to tune or adjust a configuration setting of the application.

18. The information handling system of claim 17, wherein the determination of the configuration knob includes the processor further to:

determine an application to be optimized in the information handling system; and determine a user selected knob priority, wherein the determination of the configuration knob is further determined based on the application to the optimized and the user selected knob priority.

19. The information handling system of claim 18, wherein the determination of the configuration knob is further based on a utilization of the application to be optimized.

20. The information handling system of claim 19, wherein the utilization of the application includes data associated with system resource allocations exclusive to the application.

* * * * *